United States Patent

Stark

[11] Patent Number: 5,311,750
[45] Date of Patent: May 17, 1994

[54] OIL COLLECTOR UNIT

[76] Inventor: John P. Stark, P.O. Box 566, Great Bend, Kans. 67530

[21] Appl. No.: 991,972

[22] Filed: Dec. 17, 1992

[51] Int. Cl.⁵ .......................... F25B 43/02; F25B 43/04
[52] U.S. Cl. ........................................... 62/468; 62/84;
62/292; 62/298; 62/470; 62/474; 62/475
[58] Field of Search ................... 62/84, 85, 292, 298,
62/470, 474, 475, 468

[56] References Cited

U.S. PATENT DOCUMENTS

| | | | |
|---|---|---|---|
| 320,305 | 6/1885 | Suckert | 62/84 |
| 2,986,894 | 6/1961 | Endress et al. | 62/85 |
| 3,070,977 | 1/1963 | Kimmel et al. | 62/84 X |
| 3,274,796 | 9/1966 | Kocher et al. | 62/84 X |
| 3,302,421 | 2/1967 | Karnes | 62/77 |
| 3,534,564 | 10/1970 | Miller | 62/84 X |
| 3,799,250 | 3/1974 | Dyre | 62/85 X |
| 3,974,659 | 8/1976 | Edwards | 62/85 X |
| 4,282,717 | 8/1981 | Bonar, II | 62/84 |
| 4,441,330 | 4/1984 | Lower et al. | 62/149 |
| 4,476,688 | 10/1984 | Goddard | 62/149 |
| 4,683,724 | 8/1987 | Vergel, Jr. | 62/85 |
| 4,788,825 | 12/1988 | Calupca et al. | 62/84 |
| 4,856,289 | 8/1989 | Lofland | 62/149 |
| 4,862,699 | 9/1989 | Lounis | 62/84 |
| 4,938,031 | 7/1990 | Manz et al. | 62/145 |
| 4,942,741 | 7/1990 | Hancock et al. | 62/85 |
| 5,031,414 | 7/1991 | Walter et al. | 62/298 |
| 5,038,578 | 8/1991 | Manz et al. | 62/474 X |
| 5,072,594 | 12/1991 | Squires | 62/77 |
| 5,086,630 | 2/1992 | Van Steenburgh, Jr. | 62/475 |
| 5,088,291 | 2/1992 | Squires | 62/77 |
| 5,090,211 | 2/1992 | Peters | 62/149 |
| 5,127,239 | 7/1992 | Manz et al. | 62/475 X |
| 5,167,126 | 12/1992 | Cartwright | 62/475 X |
| 5,214,937 | 6/1993 | Henrichs et al. | 62/84 X |

Primary Examiner—Henry A. Bennet
Assistant Examiner—C. Kilner
Attorney, Agent, or Firm—John R. Flanagan

[57] ABSTRACT

An oil collector unit of a refrigerant recovery system includes a housing, an interior middle vertical wall disposed in the housing, an interior middle horizontal wall disposed in the housing and intersecting the interior vertical wall and defining left and right pairs of upper and lower chambers on opposite sides of the middle vertical wall having passageways between the upper and lower chambers at opposite ends of the middle horizontal wall which are spaced from the opposite ends of the housing, and a plurality of tubes connected in flow communication with selected ones of the chambers of the housing so as to define a circuitous flow path through the chambers of the housing permitting travel of a fluid mixture of refrigerant and oil therethrough and separation of oil from refrigerant therewithin.

21 Claims, 1 Drawing Sheet

OIL COLLECTOR UNIT

BACKGROUND OF THE INVENTION

1. Field of the Invention

The present invention generally relates to refrigerant recovery equipment and, more particularly, is concerned with an oil collector unit.

2. Description of the Prior Art

Refrigerants such as "Freon", a well-known commercial brand of chlorinated fluorocarbons (CFC), are used as standard heat transfer media in refrigeration circuits for food refrigeration, air conditioners and similar appliances. Due to equipment malfunction, the refrigerant and oil can become contaminated, losing its effectiveness. Such CFC contamination can eventually cause compressor failure in the appliance due to its increased operating temperature triggered by the breakdown of CFCs after contamination.

Removal of the contaminated refrigerant from the appliance is thus necessitated. At one time the contaminated refrigerant was simply released into the atmosphere from the appliance or left to leak out from an abandoned appliance into the atmosphere. Now, however, increased environmental awareness has resulted in steps being taken to end such practices as their harmful effects on the ozone layer of the atmosphere have been widely known.

Additionally, cost considerations in recent years have stimulated efforts to develop efficient refrigerant recovery systems whereby a contaminated refrigerant can be removed from an appliance and purified of contaminants so as to be reusable in the particular appliance or to be stored appropriately for future use in other appliances. Representative examples of such systems are disclosed in Lower et al U.S. Pat. No. 4,441,330 and Lofland U.S. Pat. No. 4,856,289. Both of the systems disclosed address the problems of oil removal and refrigerant purification and recovery in a very comprehensive manner. However, each system is extremely complex in construction and thus costly to produce, providing a major drawback to their proliferation and utilization.

Consequently, a need exists for a recovery system wherein a major contaminant, such as oil, can be efficiently separated from the refrigerant fluid by simple and inexpensive means.

SUMMARY OF THE INVENTION

The present invention provides an oil collector unit designed to satisfy the aforementioned need by avoiding the drawbacks of the prior art without introducing other drawbacks. Instead the oil collector unit of the present invention provides a configuration of components which is simple in design and construction and thus, fairly inexpensive to build, while providing a highly efficient rate of oil removal from a contaminated refrigerant.

Accordingly, the present invention is directed to an oil collector unit of a refrigerant recovery system which comprises: (a) a housing defining an interior cavity; (b) a substantially vertical interior wall in the housing extending substantially intermediately thereof across the interior cavity and mounted to the housing; (c) a substantially horizontal interior wall in the housing extending substantially intermediately thereof across the interior cavity and mounted to the vertical interior wall, the horizontal interior wall extending in opposite directions from the vertical interior wall so as to define right and left pairs of upper and lower chambers on opposite sides of the vertical interior wall and on opposite sides of the horizontal interior wall with the upper and lower chambers of each pair connected in flow communication with one another; (d) drain means connected with the housing in flow communication with the lower chamber of each of pair of upper and lower chambers; and (e) a plurality of tubes connected in flow communication with selected ones of the chambers of the housing so as to define a circuitous flow path through the chambers of the housing permitting travel of a fluid mixture of refrigerant and oil therethrough and separation of oil from refrigerant therewithin.

Thus, the circuitous flow path is established for a refrigerant contaminated with oil from a refrigeration unit through the oil collector unit to a refrigerant recovery unit and recovery bottle. The particular configuration of the oil collector unit in its housing design and tubular arrangement creates a dynamic flow communication within the configuration whereby the contaminated fluid mixture continually strikes the succeeding interior walls of the unit's components as it follows its circuitous path through the unit, thus continually disengaging and separating oil droplets adhering to the refrigerant, allowing the oil to flow by gravity to the bottom of the lower chambers where it can be discharged from the drains communicating with the chambers.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
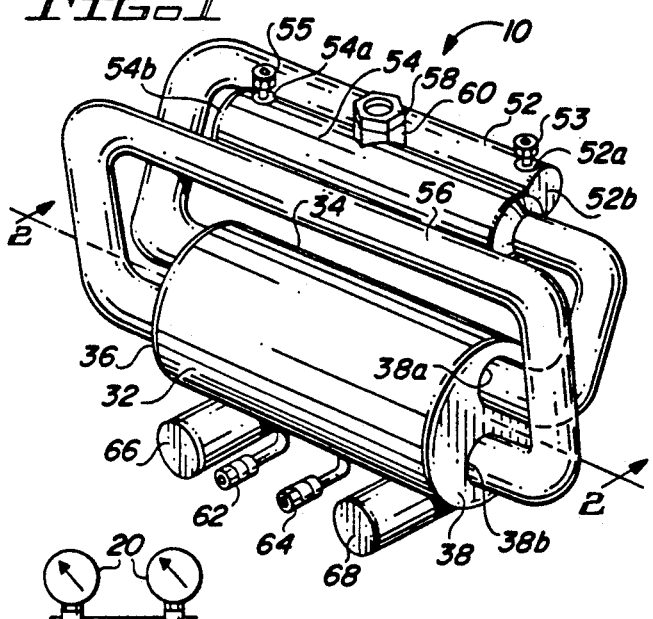
FIG. 1 is a perspective view of the oil collector unit of the present invention.
Figure 2:
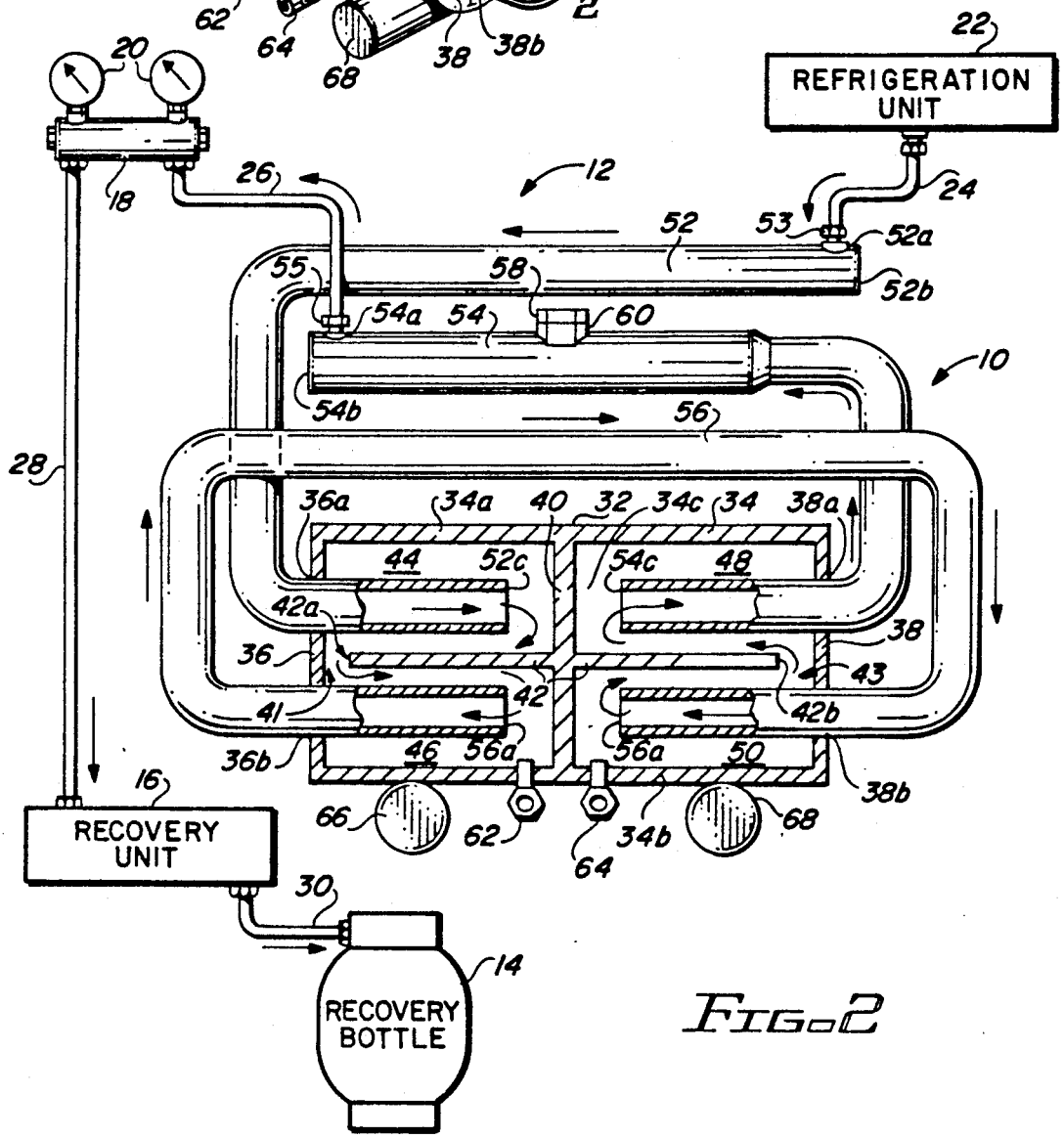
FIG. 2 is a front elevational view, partly sectioned, of the oil collector unit of FIG. 1, shown in connection with the overall system of the refrigerant recovery system.

Referring to the drawings, and particularly to FIGS. 1 and 2, there is illustrated an oil collector unit of the present invention, generally designated 10, which is employed as an improved part of an otherwise conventional refrigerant recovery system, generally designated 12. In addition to the oil collector unit 10, the recovery system 12 generally includes a recovery bottle 14, a recovery unit 16, a bank 18 of control gauges 20 and a refrigerant unit 22 from which a fluid refrigerant, such as freon, typically contaminated with oil, is to be recovered. The refrigerant unit 22 is connected in flow communication with the oil collector unit 10 by a first conduit 24. The bank 18 of control gauges 20 is connected in flow communication with the oil collector unit 10 by a second conduit 26. Third and fourth conduits 28 and 30 respectively connect the bank 18 of control gauges 20 to the recovery unit 16 and the the recovery unit 16 and the recovery unit 16 to the recovery bottle 14. The flow path of the refrigerant fluid both before and after removal of the oil is depicted by the arrows in FIG. 2.

Figure 3:
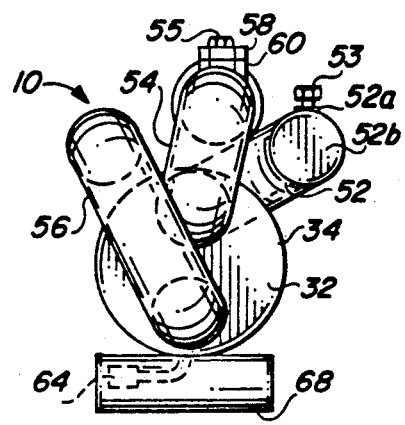
FIG. 3 is a side elevational view of the oil collector unit taken along line 2—2 of FIG. 1.

Referring now to FIGS. 1-3, the oil collector unit 10 basically includes a housing 32 in the form of a continuous tubular wall 34, preferably cylindrical in shape, and a pair of left and right opposite end walls 36, 38 attached to and enclosing opposite open ends of the tubular wall 34 so as to define an interior cavity 32a in the housing 32. The oil collector unit 10 also basically includes a substantially vertical interior wall 40 disposed in the housing 32 so as to extend substantially intermediately thereof across the interior cavity 32a, and a substantially horizontal interior wall 42 disposed in the housing 32 so as to extend substantially intermediately thereof across the interior cavity 32a in orthogonal relation to the vertical interior wall 40. The vertical interior wall 40 extends between and is mounted to the upper and lower wall portions 34a, 34b and opposite side wall portions 34c of the housing 32. The horizontal interior wall 42 is mounted to the vertical interior wall 40 and extends in opposite directions from opposite sides thereof. Together the vertical and horizontal interior walls 40, 42 define left and right pairs of upper and lower chambers 44, 46 and 48, 50 on the opposite sides of the vertical interior wall 40 and opposite sides of the horizontal interior wall 42.

The upper and lower chambers 44, 46 and 48, 50 of each pair are interconnected in flow communication with one another. Particularly, the horizontal interior wall 42 has a pair of left and right terminal ends 42a, 42b spaced respectively from the left and right end walls 36, 38 of the housing 32 so as to define left and right passageways 41, 43 past the opposite terminal ends 42a, 42b of the horizontal interior wall 42 from the upper chamber 44, 48 to the lower chamber 46, 50 of the respective left and right pairs of the chambers. Thus, the horizontal interior wall 42 extends through the housing 32 from the left passageway 41 adjacent to the left end wall 36 to the right passageway 43 adjacent to the right end wall 38, such that there is established flow communication between the left upper and lower chambers 44, 46 through the left passageway 41 and flow communication between the right upper and lower chambers 48, 50 through the right passageway 43, whereas there is no flow communication established through the vertical interior wall 40 between the left pair of chambers 44, 46 and the right pair of chambers 48, 50.

Referring to FIGS. 1-3, the oil collector unit 10 basically further includes a tubular arrangement 51 connected in flow communication with selected ones of the chambers 44, 46 and 48, 50 of the housing 32 so as to define a circuitous flow path through the chambers permitting travel of the contaminated fluid mixture of refrigerant and oil through the housing 32 and disengagement and separation of oil from refrigerant within the housing 32.

More particularly, the tubular arrangement 51 includes first, second and third tubes 52, 54, 56. The first tube 52 has an inlet 52a which is attached to one end of the first conduit 24 by a first fitting 53 disposed on the top of the first tube 52 adjacent to one enclosed end 52b thereof. The first tube 52 extends therefrom through an upper opening 36a in the left end wall 36 of the housing 32 into the upper left chamber 44. The first tube 52 is disposed in flow communication with the upper left chamber 44 by terminating at an opposite open end 52c disposed adjacent to and spaced from one side of the vertical interior wall 40 in the housing 32.

The second tube 54 has an outlet 54a which is attached to one end of the second conduit 26 by a second fitting 55 disposed on the top of second tube 54 adjacent to one enclosed end 54b thereof. The second tube 54 extends therefrom through an upper opening 38a in the right end wall 38 of the housing 32 into the upper right chamber 48. The second tube 54 is disposed in flow communication with the upper right chamber 48 by terminating at an opposite open end 54c disposed adjacent to and spaced from the opposite side of the vertical interior wall 40 in the housing 32.

The third tube 56 extends about the exterior of the housing 32 and is disposed in flow communication with and extends through the lower chambers 46, 50 of the housing 32. One end portion of the third tube 56 extends through a lower opening 36b in the left end wall 36 into the lower left chamber 46, while an opposite end portion of the third tube 56 extends through a lower opening 38b in the right end wall 38 into the lower right chamber 50. The third tube 56 terminates at opposite open ends 56a disposed adjacent to and spaced from the opposite sides of the interior vertical wall 40 in the housing 32. The first, second and third tubes 52, 54, 56 in the above-described tubular arrangement 51 define the circuitous fluid flow path, as depicted by arrows in the housing 32, from the first conduit 24 into the inlet 52a and through the first tube 52, then from the first tube 52 into and through the left upper chamber 44 of the housing, then from the housing 32 through the third tube 56, then from the third tube 56 back into the housing 32 through the right upper chamber 48 of the housing 32 and, finally, from the housing 32 and through the second tube 54 to the outlet 54a thereof to the second conduit 26.

Referring to FIGS. 1-3, the oil collector unit 10 further includes a sight glass 58 supported by mount 60 attached on top of the second tube 54 near the outlet 54a thereof. The sight glass 58 is employed by the user for inspecting fluid flowing within the second tube 54 toward the outlet 54a. The unit 10 also includes a pair of drains 62, 64 connected with the lower left and right chambers 46, 50 respectively. Also, the housing 32 of the oil collector unit 10 is positioned on a support surface by a pair of support bases 66, 68 which are cylindrical in shape with enclosed opposite ends. The support bases 66, 68 are disposed horizontally beneath the housing 32, extending between the front and rear of the housing 32, with the support base 66 being disposed beneath the left chambers 44, 46 and the support base 68 being disposed beneath the right chambers 48, 50 of the housing 32.

Referring particularly to FIG. 2 and the arrow path depicted therein, the configuration of housing design and tubular arrangement of the oil collector unit 10 defines the circuitous flow path for the refrigerant fluid from the refrigeration unit 22 through conduit 24 into the oil collector unit 10 and therefrom, by way of conduits 28, 30 respectively, into recovery unit 16 and recovery bottle 14. The refrigerant fluid, typically contaminated with oil, generally emerges from the refrigeration unit 22 in a foamy condition, with oil droplets adhering to bubbles of the refrigerant. As the foamy refrigerant and oil mixture travels through the configuration of the oil collector unit 10, the mixture strikes the succeeding interior surfaces of the various components of unit 10 as it passes through the housing, continually impacting on the foamy bubbles and tending to disengage the oil droplets from the refrigerant bubbles. Since the oil is chemically heavier in weight than the refrigerant, the separated oil droplets tend to flow by gravity to the lower wall portion 32b of the housing 32, from which the oil can be discharged through drains 62, 64.

Specifically, flow communication commences with the passage of the refrigerant mixture from refrigeration unit 22 through conduit 24 into the inlet 52a of the first tube 52. The mixture then flows through tube 52, emerging therefrom at open end 52c, thereupon immediately striking the vertical interior wall 40 as the mixture enters the upper left chamber 44. Such abrupt impacting of the foamy mixture on the wall 40 tends to initiate disengagement of oil droplets from the refrigerant. Therefrom the fluids flow on from upper left chamber 44 through left passageway 41 into lower left chamber 46, again striking the middle vertical wall 40 as the mixture then enters the third tube 56 at its one open end 56a. The mixture repeatedly strikes the adjacent housing and tubular walls as flow proceeds, thus continually disengaging oil droplets from the foamy refrigerant. The oil thus far separated from the refrigerant in left chambers 44, 46 tends to settle by gravity at the bottom of the lower left chamber 46 from which it can be discharged through drain 62. The flow further progresses through the third tube 56, emerging therefrom at the opposite open end 56b in the lower right chamber 50, again striking against the vertical interior wall 40 as the mixture emerges from the open end 56b. The flow then moves through right passageway 43 into the upper right chamber 48, again striking the vertical interior wall 40 as the flow enters the open end 54c of the second tube 54. The oil separated from the refrigerant in the right chambers 48, 50 flows by gravity to the bottom of the lower right chamber 50 from which it is discharged through drain 64. The separated refrigerant flow then continues through the second tube 54, being monitored the operator by use of the sight glass 58 mounted to the second tube 54 to determine the efficacy of oil removal from the refrigerant. The refrigerant emerges at outlet 54a of the second tube 54 from the oil collector unit 10 into the second conduit. The refrigerant then flows from the conduit 26 through the rest of the refrigerant recovery system in a conventional manner.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. An oil collector unit for use in a refrigerant recovery system, said unit comprising:
   (a) a housing defining an interior cavity;
   (b) a substantially vertical interior wall in said housing extending substantially intermediately thereof across said interior cavity and mounted to said housing;
   (c) a substantially horizontal interior wall in said housing extending substantially intermediately thereof across said interior cavity and mounted to said vertical interior wall to define right and left pairs of upper and lower chambers on opposite sides of said vertical interior wall and on opposite sides of said horizontal interior wall, said upper and lower chambers of each pair interconnected in flow communication; and
   (d) a plurality of tubes connected in flow communication with selected ones of said chambers of said housing so as to define a circuitous flow path through said chambers of said housing permitting travel of a fluid mixture of refrigerant and oil therethrough and disengagement of oil from refrigerant therewithin, said plurality of tubes including first, second and third tubes defining said circuitous fluid flow path into an inlet and through said first tube, then from said first tube into and through one of said pairs of said upper and lower chambers of said housing, then from said housing through said third tube, then from said third tube back into said housing through the other of said pairs of said upper and lower chambers of said housing and, finally, from said housing and through said second tube to an outlet.

2. The unit of claim 1 wherein said first tube has said inlet defined therein and is disposed in flow communication with said upper chamber of said one pair of upper and lower chambers of said housing.

3. The unit of claim 2 wherein said first tube further extends through said upper chamber of said one pair of upper and lower chambers, said first tube terminating at an open end being disposed adjacent to and spaced from one of said opposite sides of said vertical interior wall in said housing.

4. The unit of claim 2 wherein said second tube has said outlet defined therein and is disposed in flow communication with said upper chamber of said other pair of upper and lower chambers of said housing.

5. The unit of claim 4 further comprising:
   a sight glass mounted on said second tube adjacent said outlet thereon for inspecting flow of fluid within said second tube.

6. The unit of claim 4 wherein said second tube further extends through said upper chamber of said other pair of upper and lower chambers of said housing, said second tube terminating at an open end being disposed adjacent to and spaced from the other of said opposite sides of said vertical interior wall in said housing.

7. The unit of claim 4 wherein said third tube extends about the exterior of said housing and is disposed in flow communication with said lower chambers thereof.

8. The unit of claim 7 wherein said third tube further extends through said lower chambers, said third tube terminating at opposite open ends being disposed adjacent to and spaced from said opposite sides of said vertical interior wall.

9. The unit of claim 1 further comprising: drain means connected with said housing in flow communication with said lower chamber of each of said pair of upper and lower chambers.

10. The unit of claim 1 further comprising: a pair of spaced bases attached to and underlying said housing for supporting said housing upon a support surface.

11. The unit of claim 10 wherein each of said bases extends beneath one of said pairs of upper and lower chambers of said housing.

12. The unit of claim 1 wherein said housing has upper and lower wall portions and opposite side wall portions extending between and interconnecting said upper and lower wall portions.

13. The unit of claim 12 wherein said vertical interior wall is attached to said upper and lower wall portions and opposite side wall portions of said housing.

14. The unit of claim 12 wherein said housing also has a pair of opposite end wall portions attached to and enclosing opposite open ends of said housing formed by said upper and lower wall portions and opposite side wall portions so as to define said interior cavity in said housing.

15. The unit of claim 14 wherein said horizontal interior wall is attached to said opposite side wall portions of said housing and to said opposite sides of said vertical interior wall, said horizontal interior wall having opposite terminal ends being spaced from said opposite end wall portions of said housing so as to define right and left passageways past said opposite terminal ends of said horizontal interior wall from said upper chamber to said lower chamber of a respective one of said pairs thereof.

16. An oil collector unit for use in a refrigerant recovery system, said unit comprising:
   (a) a housing having a continuous tubular wall and a pair of opposite end walls attached to and enclosing opposite open ends of said tubular wall so as to define an interior cavity in said housing;
   (b) a substantially vertical interior wall in said housing extending substantially intermediately thereof across said interior cavity and mounted to said tubular wall;
   (c) a substantially horizontal interior wall in said housing extending substantially intermediately thereof across said interior cavity and mounted to said vertical interior wall at opposite sides thereof and extending in opposite directions from said vertical interior wall to define right and left pairs of upper and lower chambers on said opposite sides of said vertical interior wall and on opposite sides of said horizontal interior wall, said upper and lower chambers of each pair interconnected in flow communication;
   (d) drain means connected with said housing in flow communication with said lower chamber of each of said pair of upper and lower chambers; and
   (e) a plurality of tubes connected in flow communication with selected ones of said chambers of said hosing so as to define a circuitous flow path through said chambers of said housing permitting travel of a fluid mixture of refrigerant and oil therethrough and disengagement of oil from refrigerant therewithin, said plurality of tubes including first, second and third tubes defining said circuitous fluid flow path into an inlet and through said first tube, then from said first tube into and through one of said pairs of said upper and lower chambers of said housing, then from said housing through said third tube, then from said third tube back into said housing through the other of said pairs of said upper and lower chambers of said housing and, finally, from said housing and through said second tube to an outlet.

17. The unit of claim 16 wherein said first tube has said inlet defined therein and is disposed in flow communication with and extends through said upper chamber of said one pair of upper and lower chambers of said housing, said first tube terminating at an open end being disposed adjacent to and spaced from one of said opposite sides of said interior vertical wall in said housing.

18. The unit of claim 17 wherein said second tube has said outlet defined therein and is disposed in flow communication with and extending through said upper chamber of said other pair of upper and lower chambers of said housing, said second tube terminating at an open end being disposed adjacent to and spaced from the other of said opposite sides of said interior vertical wall in said housing.

19. The unit of claim 18 wherein said third tube extends about the exterior of said housing and is disposed in flow communication with and extends through said lower chambers of said housing, said third tube terminating at opposite open ends being disposed adjacent to and spaced from said opposite sides of said interior vertical wall in said housing.

20. The unit of claim 16 further comprising:
   a pair of spaced bases attached to and underlying said housing for supporting said housing upon a support surface.

21. The unit of claim 16 wherein said horizontal interior wall has opposite terminal ends spaced from said opposite end walls of said housing so as to define right and left passageways past said opposite terminal ends of said horizontal interior wall from said upper chamber to said lower chamber of a respective one of said pairs thereof.

* * * * *